US011436162B2

(12) United States Patent
Gemelli et al.

(10) Patent No.: US 11,436,162 B2
(45) Date of Patent: Sep. 6, 2022

(54) FUNCTIONAL SAFETY METHOD, CORRESPONDING SYSTEM-ON-CHIP, DEVICE AND VEHICLE

(71) Applicants: STMicroelectronics (Grenoble 2) SAS, Grenoble (FR); STMicroelectronics International N.V., Schiphol (NL); STMicroelectronics S.r.l., Agrate Brianza (IT)

(72) Inventors: Riccardo Gemelli, Carugate (IT); Denis Dutey, Jarrie (FR); Om Ranjan, New Delhi (IN)

(73) Assignees: STMicroelectronics (Grenoble 2) SAS, Grenoble (FR); STMicroelectronics S.r.l., Agrate Brianza (IT); STMicroelectronics International N.V., Schiphol (NL)

( * ) Notice: Subject to any disclaimer, the term of this patent is extended or adjusted under 35 U.S.C. 154(b) by 284 days.

(21) Appl. No.: 16/881,949

(22) Filed: May 22, 2020

(65) Prior Publication Data
US 2020/0379924 A1    Dec. 3, 2020

(30) Foreign Application Priority Data
May 28, 2019    (IT) .................. 102019000007398

(51) Int. Cl.
| G06F 12/14 | (2006.01) |
| G06F 11/07 | (2006.01) |
| G06F 13/40 | (2006.01) |
| H04L 9/40 | (2022.01) |

(52) U.S. Cl.
CPC ...... *G06F 12/1458* (2013.01); *G06F 11/0772* (2013.01); *G06F 13/4063* (2013.01); *H04L 63/126* (2013.01); *G06F 2213/0038* (2013.01)

(58) Field of Classification Search
CPC ............. G06F 11/0772; G06F 11/0739; G06F 11/0751; G06F 11/141; G06F 12/1458; G06F 13/4063; G06F 21/62; G06F 21/64; G06F 2213/0038
See application file for complete search history.

(56) References Cited

U.S. PATENT DOCUMENTS

| 6,717,874 B1 | 4/2004 | Perner et al. |
| 9,268,632 B2 * | 2/2016 | Linstadt ............... G06F 11/1048 |
| 2014/0239987 A1 * | 8/2014 | Mayer ................ G01R 31/2894 324/750.3 |

(Continued)

*Primary Examiner* — Raymond N Phan
(74) *Attorney, Agent, or Firm* — Slater Matsil, LLP

(57) ABSTRACT

A method is provided to access a data storage memory that stores data signals in a plurality of indexed memory locations. An access control circuit receives a memory access request signals from a processing circuit. The method includes replicating the respective memory access request signals to provide for each a respective replicated memory access request signal, accessing indexed internal memory locations to retrieve a first data signal retrieved as a function of the respective memory access request signal and a second data signal retrieved as a function of the respective replicated memory access request signal, and checking for identity the first data signal and the at least one second data signal. The access control circuit transmits to the processing circuit a data signal or an integrity error flag signal as a result of the identity check.

20 Claims, 3 Drawing Sheets

(56) References Cited

U.S. PATENT DOCUMENTS

| | | |
|---|---|---|
| 2014/0281564 A1 | 9/2014 | Nagai et al. |
| 2015/0175170 A1* | 6/2015 | Aoki .................. B60W 50/023 |
| | | 701/45 |
| 2018/0032394 A1* | 2/2018 | Quach .................... G11C 29/04 |
| 2019/0243566 A1* | 8/2019 | Hassan ................. G06F 3/0631 |

* cited by examiner

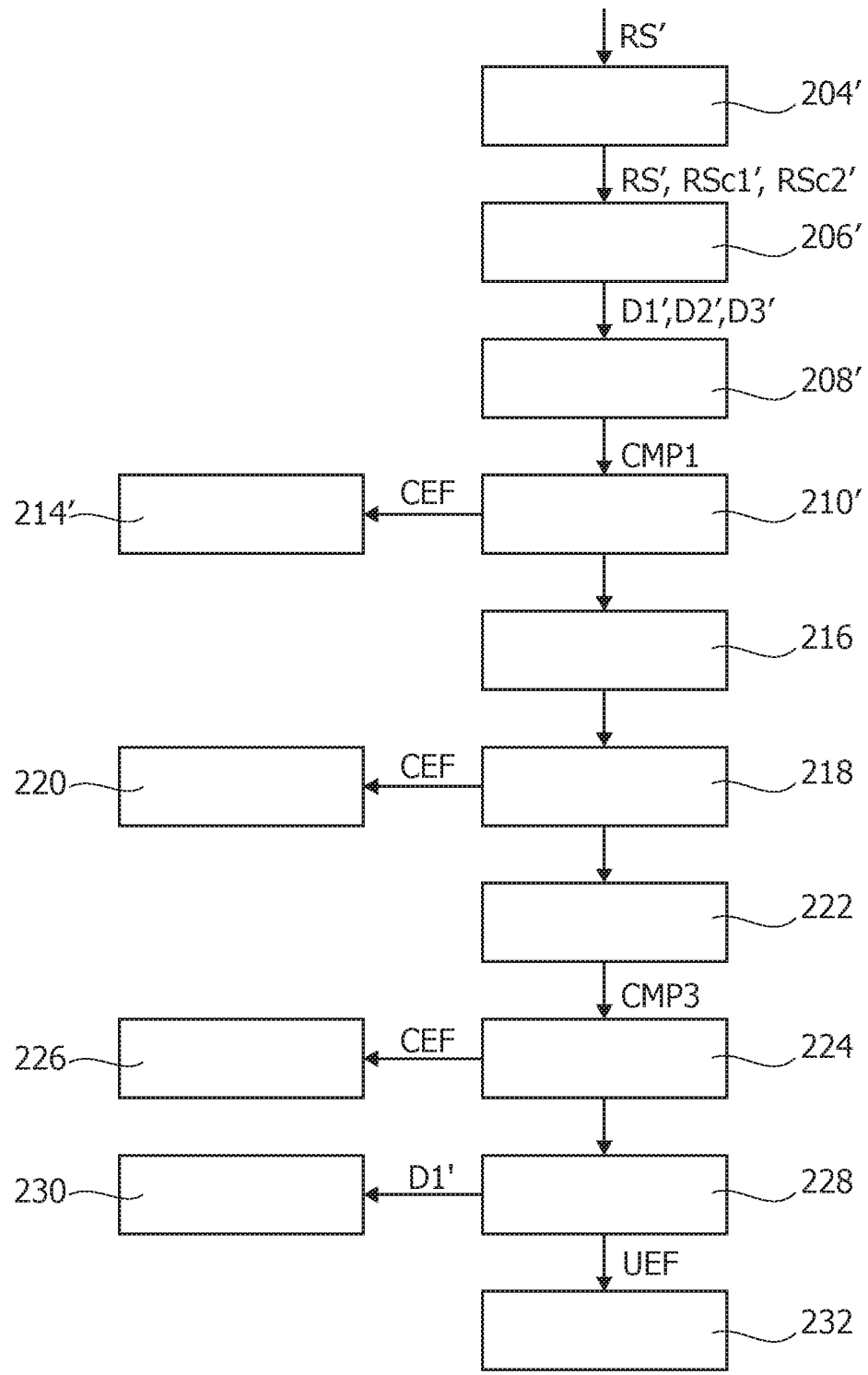

FUNCTIONAL SAFETY METHOD, CORRESPONDING SYSTEM-ON-CHIP, DEVICE AND VEHICLE

CROSS-REFERENCE TO RELATED APPLICATIONS

This application claims priority to Italian Patent Application No. 102019000007398, filed on May 28, 2019, which application is hereby incorporated herein by reference.

TECHNICAL FIELD

The description relates to functional safety method and a corresponding system-on-chip.

BACKGROUND

Modern vehicles, cars in particular, are becoming increasingly complex automotive systems nowadays.

An increasing number of electronic circuits and systems may be implemented on-board vehicles, having growingly relevant control functions. As a consequence, safety and reliability standards of operations of such electronic circuits and systems are becoming increasingly higher.

Specifically, for parts of the control infrastructure which may be safety-related, fault-tolerance may be taken into account when designing the electronic systems, facilitating such systems to operate properly even in case of unpredictable faults, e.g., abnormal conditions that can cause a system or part of a system to fail.

In particular, in the context of safety-relevant automotive products, fault-tolerance of electronic systems may play a role in fulfilling safety requirements, e.g., according to the ISO 26262 standard (also known as Automotive Safety Integrity Level, briefly ASIL).

A car control system infrastructure may rely on control processing units, briefly CPUs. A CPU may send signals to control electronic circuits and systems, e.g., like how a brain controls a body. In order to do so, CPUs may access, e.g., read/write, instructions or data which may be stored in one or more memories, e.g., on-chip or off-chip memories.

After accessing data, e.g., reading instructions, a CPU operation may be completely dictated by the data content accessed, e.g., via execution of a sequence of instructions read. In the context of a control system of a vehicle, such data content retrieved from memory by the CPU may dictate behavior of the vehicle itself. Hence, for the purpose of safety, data stored in memories accessed by control CPU may be highly valuable to take decisive actions, e.g., steering the wheel to avoid a collision with an obstacle.

As a consequence, the integrity of CPU access-to-memory operations may be viewed of like importance to that of the integrity of the functionality of the CPU itself.

Integrity refers to the property of being resilient with respect to faults or to malicious attacks on hardware components.

In automotive safety-related systems, e.g., safety-critical systems, existing solutions to protect such memories and their interface from faults may be very expensive and complex.

In fact, in modern electronic car control systems, the amounts of data used by CPUs are also growing. As a consequence, memories configured to store such amounts of data may be big and expensive, e.g., in terms of size and density. In some cases, such memories may be located on a different chip from the one on which the CPU may be located.

Known solution approaches to protect the memories and their interfaces from faults may comprise providing redundant systems or sub-systems, e.g.:

providing multiple replicas of an entire control system on-board a vehicle; such a solution presents the drawback of having huge costs, e.g., from the hardware (HW) system integration point of view, providing multiple replicas of one or more memory blocks, such a solution may be cheaper than replicating the entire system from a HW point of view but it presents the drawback of having huge costs from the point of view of software (SW) integration;

employing error-correcting code (ECC) memory blocks equipped with an error-detecting code (EDC) technique; such solution presents the drawback of providing limited fault coverage, e.g., with limited coverage of single point and common cause faults, e.g., coverage limited to single- or two-bit faults. Fault coverage may refer to the percentage of some type of fault that can be detected during the test of any engineered system.

Despite the extensive activity in that area, further improved solutions may be desirable.

SUMMARY

One or more embodiments can contribute in providing improved solutions.

The description relates to functional safety of electrical and/or electronic systems, such as fault-tolerant electronic control circuits. One or more embodiments may be applied to electronic control systems for automotive, e.g., car, control circuits.

A CPU-to-memory access management method may be exemplary of such a method.

One or more embodiments may relate to a corresponding system.

A system-on-chip configured to facilitate integrity of, e.g., multiple data transfers between CPU and memory may be exemplary of such a system.

One or more embodiments may relate to a corresponding circuit.

A cheap hardware block integrated in a die of a CPU may be exemplary of such a circuit.

One or more embodiments may relate to a vehicle (e.g., a car) equipped with one or more embodiments of such a system.

One or more embodiments may facilitate increasing tolerance of safety-related processors against faults which may occur in the memory system.

One or more embodiments may provide an architecture in which safety-related complexity of the system is located mainly in the HW memory system rather than in the CPU (as in the case of the, e.g., SW, redundancy architectures).

One or more embodiments may facilitate, advantageously:

increasing fault-coverage of fault-tolerant systems, e.g., a set of fault-cases that may be tolerated, facilitating reaching a highest level of ISO 26262, especially for systems comprising off-chip memories;

increasing high-availability of the memory system;

saving of the cost of "intrinsic" complex memory integrity protection devices (e.g., ECC can be removed);

simplification of SW architecture, avoiding the employ of SW redundancy.

One or more embodiments may employ a transfer replicator hardware circuit block to facilitate to control memory access increasing the processor tolerance against memory system faults, e.g., by repeating the accesses coming from the processor multiple times and/or in multiple places and checking if the respective accessed data are identical to one other.

In one or more embodiments, memory access control using transfer replication processing may be automatic, e.g., not visible to the SW executed by the processor, hence reducing delays in operations and reducing the complexity of integration phases.

In one or more embodiments, the impact on system performance in term of memory access latency may be limited thanks to early response mechanisms.

In one or more embodiments, fault tolerance may be increased by means of correction by majority voting between retrieved data. This may, advantageously, facilitate the CPU to keep executing even in the presence of one detected error, e.g., by using triplication.

BRIEF DESCRIPTION OF THE DRAWINGS

One or more embodiments will now be described, by way of non-limiting example only, with reference to the annexed figures, wherein:

FIG. 2B is an exemplary diagram of one or more embodiments of a safety-related method as per the present disclosure.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices.

Figure 1:
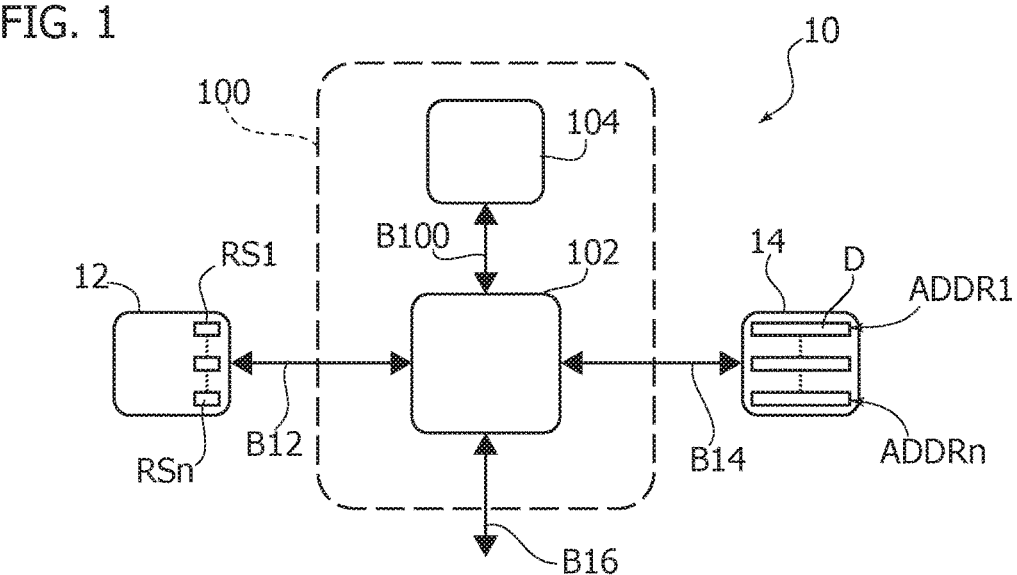
FIG. 1 is an exemplary diagram of a system architecture as per the present disclosure.

By way of introduction to a detailed description of exemplary embodiments, reference may be first had to FIG. 1.

FIG. 1 is an exemplary diagram of a system, e.g., a system-on-chip (briefly, SoC) integrating a plurality components of a car electronic control system. The system includes a processing circuit block 12, e.g., a central processing unit CPU or a microcontroller unit MCU. A memory circuit block 14, e.g., a Random-Access Memory, briefly RAM, circuit block, is configured to store data signals D, e.g., data from sensors on the vehicle V and/or instructions to operate the processing circuit block 12, in a plurality of indexed internal memory locations ADDR1, ADDRn and to provide respective data signals D as a function of respective memory access request signals RS1, RSn, the memory access request signals comprising indexes of at least one memory location ADDR1, ADDRn.

A coupling circuit 100, e.g., as an access control circuit 100, is coupled to the data storage memory 14 and configured to receive memory access request signals RS1, RSn issued by a processing circuit 12 or provide signals to the processing circuit 12 and to process memory access request signals RS1, RSn issued by a processing circuit 12, in order to provide fault-tolerant data-communication between CPU 12 and memory 14, e.g., as a result of operating as a data transfer replicator.

In one or more embodiments, the coupling circuit block 100 and the processing circuit block 12 may be integrated in a same die, e.g., the coupling circuit block 100 being a "cheap" hardware component integrated in the same die/chip where the CPU lies.

In one or more embodiments, the memory circuit block 14 may be comprised in a different die/chip than the one hosting the CPU and the coupling circuit block 100.

In one or more embodiments, the processing circuit block 12 and the memory circuit block 14 may be coupled to the coupling circuit block 100 via respective buses, for instance: a first bus B12, e.g., an AXI 4 compliant bus with data integrity protection functionalities, coupling the processing circuit block 12 and the coupling circuit block 102 and configured to communicate data related to memory access requests from CPU, and a second bus B14, e.g., an AXI 4 compliant bus with data integrity protection functionalities, coupling the coupling circuit block 100 and the memory circuit block 14 and configured to communicate therebetween data related to memory access requests from CPU and/or data read from the memory as a result of such data access requests from CPU.

In one or more embodiments, such a system 10 may be configured to be coupled to further electronic systems, e.g., one or more electronic actuators in a vehicle V, via a third bus B16, e.g., an Advanced Peripheral Bus (APB) compliant bus. For instance, such bus B16 may facilitate exchanging control signals from CPU 12 to car actuators.

In one or more embodiments as exemplified in FIG. 1, the security circuit block 100 may comprise a transfer replicator circuit block 102, configured to receive memory access requests RS1, . . . , RSn from the CPU 12, access the memory 14 a number of times at least twice than what requested by the CPU 12, at least one the number of received memory access requests via replicating the received memory access requests RS1, . . . , RSn, e.g., receiving a single memory access request RS and generating one copy RSc1 or two copies RSc1, RSc2 of the request RS, and collecting data from the memory each time an access is performed, provide such collected data D1, D2; D3 to a comparator circuit block or identity-check circuit block 104.

The comparator circuit block 104 is configured to check for identity among data D1, D2; D3 accessed by the transfer replicator 102 from the transfer replicator 102 and to compare them pairwise therebetween, in order to verify whether they match. The comparator circuit block 103 is configured to provide as an output either one of an enable signal as a result of the identity-check, e.g., in the case in which at least a pair of memory accessed data received are equal therebetween, or providing an integrity error signal/flag, in case at least a pair of memory accessed data received are found not equal therebetween, facilitating providing an early response.

Figure 2A:
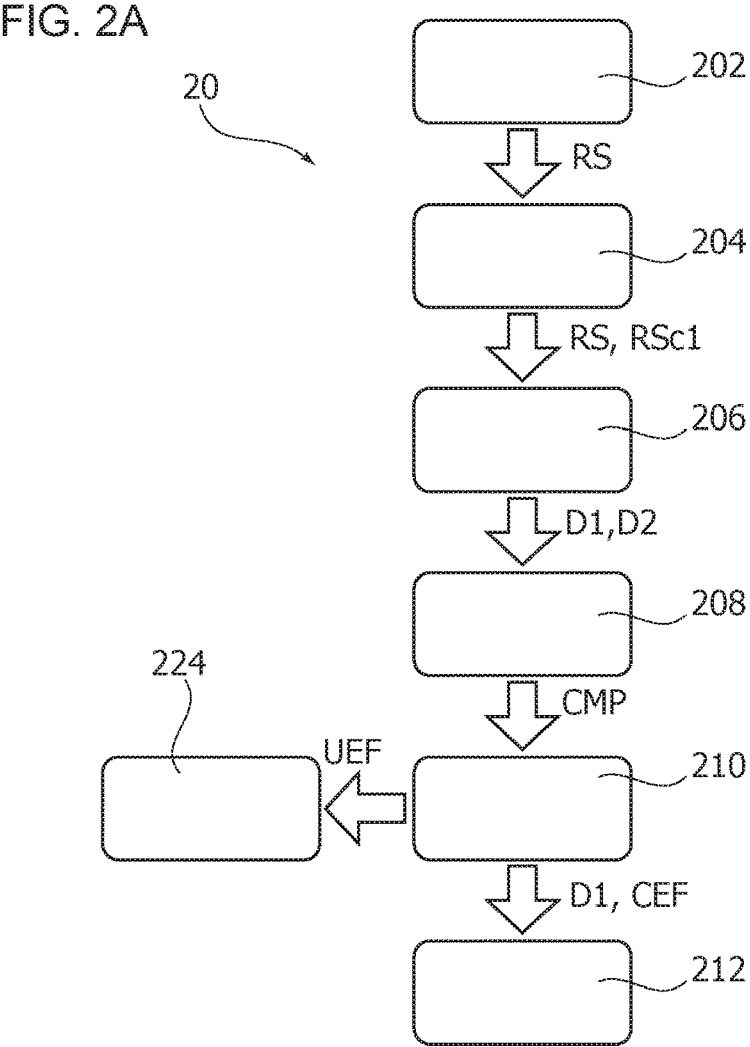
FIG. 2A is an exemplary diagram of a safety-related method as per the present disclosure.

FIG. 2A is exemplary of a method 20 of processing a memory access request from the CPU, for instance employing a system 10 as exemplified in FIG. 1.

One or more embodiments may comprise Boolean variables, which may have "true/false" values: for instance, a true statement may return a first value, e.g., "1", while a false statement returns a second value, e.g., "0".

In one or more embodiments, the method 20 comprises:
receiving 202, e.g., via the transfer replicator circuit 102, a memory access request signal RS issued by the processing circuit 12,
replicating at least once 204 a memory access request signal RS in the memory access request signals RS, e.g., producing a set of signals comprising, e.g., the original memory access request signal RS and a copy thereof RSc1,
accessing 206 the data storage memory 14 and retrieving therefrom a set of data signals, for instance at least a first data signal D1, a second data signal D2 and optionally a third data signal (see for instance FIG. 2B), as a function of each memory access request signal in the set of replicated memory access request signals RS, RSc1,
checking for identity 208, 210, for instance comprising:
a) comparing 208, e.g., in the identity-check circuit block 104 in the coupling circuit 100, such data signals in the retrieved set of data signals D1, D2 pairwise therebetween, in order to verify whether they match one to another, e.g., to verify that the content retrieved as a result of the multiple memory access requests is always the same, producing an indicator signal CMP, e.g., a Boolean indicator, as a result of the comparison 208,
b) evaluating 210 the indicator signal CMP resulting from such comparison, the indicator having a first value or set of values, e.g., true, if the data are equal therebetween and having a second value, e.g., false, in other cases, for instance as a function of a predisposed table of truth, and operating the coupling circuit 100 to selectively provide or transmit 212, 214 to the processing circuit 12, as a function of the produced, e.g., Boolean, indicator signal CMP, either one of:
i) at least one signal, e.g., D1, among signals in the set of data signals D1, D2 when the indicator signal CMP has a first value, e.g., true, optionally together with a correctable error flag signal CEF as discussed in the following (for instance with respect to FIG. 2B),
ii) an error flag signal UEF, in particular an integrity error flag, when all identity checks have a negative outcome and the indicator signal CMP has a second value different from the first value, e.g., false.

In one or more embodiments, replicating the signal once may be particularly indicated for a system which may be safe but not fault tolerant: in this case duplication may be enough and the device 10 with the coupling circuit 100 may be used to reduce the cost of the mechanisms protecting the RAMs (e.g., facilitating avoiding the use of complex and expensive EDC/ECC memories).

In one or more embodiments, replicating the signal twice may be particularly indicated for a system which may be employing fault-tolerant levels of safety: in this case triplication may be an option and the CPU can keep executing even if one error is detected, as discussed in the following with reference to FIG. 2B.

In one or more embodiments as exemplified in FIG. 2B, the operation of comparing 208 data signals in the retrieved set of data signals (e.g., pair-wise) therebetween may be interrupted before completion, in order to provide an early response and to limit impact on system latency.

In one or more embodiments as exemplified in FIG. 2B, the method may comprise:
replicating at least twice 204' a memory access request signal RS' in the memory access request signals RS' received, e.g., producing a set of signals comprising, e.g., the original memory access request signal RS' and a pair of copies thereof RSc1', RSc2',
accessing 206' the data storage memory 14 and retrieving therefrom a set of data signals, for instance at least a first data signal D1', a second data signal D2' and a third data signal D3', as a function of each memory access request signal in the set of replicated memory access request signals Rs', RSc1', RSc2',
checking for identity, for instance comprising:
applying a first comparison 208', e.g., in the identity-check circuit block 104 in the coupling circuit 100, between such first data signal D1' and such second data signal D2 in the retrieved set of data signals D1', D2', D3', in order to verify whether they match one to another, e.g., to verify that the content retrieved as a result of the multiple memory access requests is always the same, producing a first indicator signal CMP1, e.g., a Boolean indicator, as a result of the first comparison 208,
evaluating 210' the first indicator signal CMP1 resulting from such first comparison, the indicator having a first value or set of values, e.g., true, if the data are equal therebetween and having a second value, e.g., false, in other cases, for instance as a function of a predisposed table of truth, and operating the coupling circuit 100 to:
a) selectively provide or transmit 214' to the processing circuit 12, as a function of the produced, e.g., Boolean, indicator signal CMP1 a correctable error flag signal CEF when the indicator signal CMP has a second value different from the first value, e.g., false, in case the identity check has a negative outcome;
b) applying a second comparison 216, e.g., in the identity-check circuit block 104 in the coupling circuit 100, between such first data signal D1' and such third data signal D3 in the retrieved set of data signals D1', D2', D3', in order to verify whether they match one to another, e.g., to verify that the content retrieved as a result of the multiple memory access requests is always the same, producing a second indicator signal CMP2, e.g., a Boolean indicator, as a result of the second comparison 216.

As mentioned, providing or transmitting 214' the correctable error flag as a result of the first comparison and evaluation 210' facilitates to advantageously limit the impact on the system performance in term of memory access latency.

In one or more embodiments as exemplified in FIG. 2B, the method may comprise further operations of:
evaluating 218 the second indicator signal CMP2 resulting from such second comparison 216, the second indicator having a first value or set of values, e.g., true, if the data D1', D3', are equal therebetween and having a second value, e.g., false, in other cases, for instance as a function of a predisposed table of truth, and operating the coupling circuit 100 to:

i) selectively provide or transmit 220 to the processing circuit 12, as a function of the produced, e.g., Boolean, second indicator signal CMP2 a correctable error flag signal CEF when the second indicator signal CMP2 has a second value different from the first value, e.g., false, in case the identity check has a negative outcome;

ii) applying a third comparison 222, e.g., in the identity-check circuit block 104 in the coupling circuit 100, between such second data signal D2' and such third data signal D3 in the retrieved set of data signals D1', D2', D3', in order to verify whether they match one to another, e.g., to verify that the content retrieved as a result of the multiple memory access requests is always the same, producing a third indicator signal CMP3, e.g., a Boolean indicator, as a result of the third comparison 222.

In one or more embodiments as exemplified in FIG. 2B, the method may further comprise the operations of:

evaluating 228 the result of first, second and third comparisons 208', 216, 222 wherein evaluating comprises verifying whether any comparison indicators CMP1, CMP2, CMP3 has a first value, e.g., true, and in case at least one indicator have a first value, e.g., CMP3=true, CMP2=false, CMP1=false, indicative of the case in which a majority of identity checks 208', 216, 222 have a positive outcome, and selectively providing or transmitting 220 to the processing circuit 12, as a function of the evaluation 228, either one of:

providing any data in the pair of data that, when compared, resulted in a majority of positive identity checks; for instance, if D1' is not equal to D2 while D3=D1 or D3'=D2', then provide the third signal D3;

an uncorrectable error flag signal UEF when the first, the second and the third indicator signals CMP1, CMP2 and CMP3 have a second value different from the first value, e.g., false, as a result of identity checks having only negative outcomes.

In one or more embodiments, the method may advantageously facilitate improved fault tolerance, facilitating error correction by majority voting 228 among the identity-checks of retrieved data D1', D2', D3'.

In one or more embodiments, the method 20 for operating the device 10 may be performed automatically, independently of the software instructions at the high or low level, e.g., being not "visible" to the software level.

In one or more embodiments, the processing circuit 12 and the coupling circuit 100 may be mounted on a same system-on-chip, while the memory circuit 14 may be an off-chip memory coupled to the SoC via the second bus B14.

Figure 3:
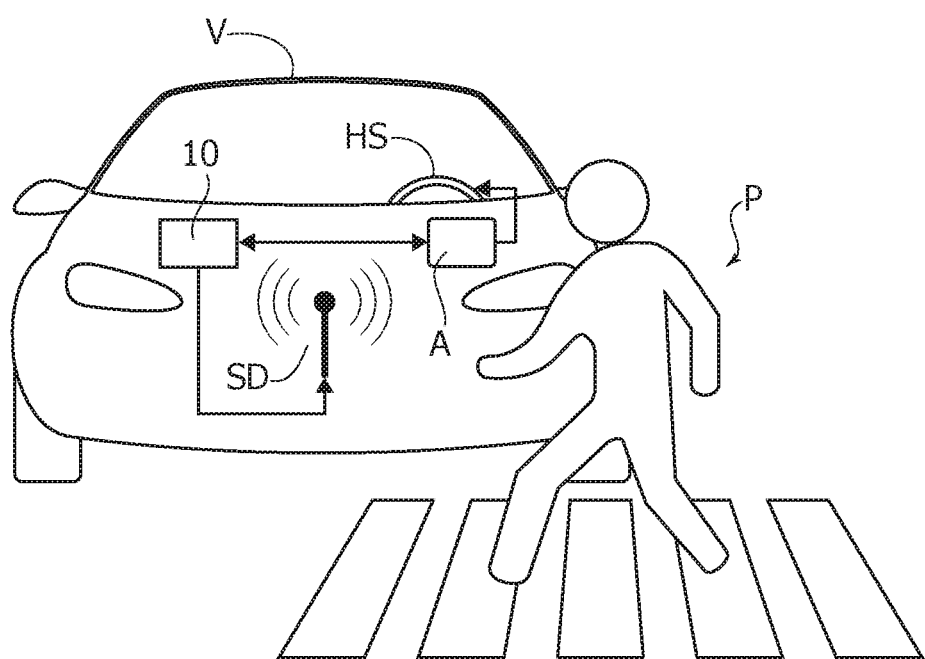
FIG. 3 is exemplary of a vehicle equipped with a system as per the present disclosure.

FIG. 3 is exemplary of a vehicle V equipped with the device/system 10.

As mentioned, modern vehicles, in particular road vehicles, may be equipped with a plurality of sensors/detecting sub-systems SD, e.g., a radar/LIDAR sensor system, and may comprise a plurality of actuators A, e.g., one or more actuators for the hand steering wheel HS, in particular for self-driving cars. In one or more embodiments, the device 10 on-board the vehicle V may be coupled to the sensors SD and the actuators A and may facilitate applying a safety feedback between the two, in particular for self-driving or automated car vehicles.

For instance, as depicted in FIG. 3, when a pedestrian P crosses the road un-avertedly, the LIDAR sensor SD may detect its presence and the data from the sensor may be stored in the memory 14 and the processing unit 12 may poll the memory to check for changes in the data.

If the wrong address in the memory is accessed due to a fault in the hardware, this may lead to a dangerous situation. Conversely, thanks to the coupling circuit 100 in the device 10, data may be accessed securely, facilitating reducing accidents and increasing road safety.

One or more embodiments may comprise to a method (for instance, 20) of accessing a data storage memory (for instance, 14) configured to store data signals (for instance, D) in a plurality of indexed memory locations (for instance, ADDR1, ADDRn). In one or more embodiments, the method may comprise:

coupling an access control circuit (for instance, 100) to the data storage memory, the access control circuit configured to receive (for instance, 202) memory access request signals (for instance, RS; RS') sourced from a processing circuit (for instance, 12) and to access indexed memory locations in the plurality of indexed memory locations to retrieve data signals (for instance, D1, D2; D1', D2', D3') therein as a function of respective memory access request signals received (for instance, RS; RS'), replicating at least once (for instance, 204) the respective memory access request signals received at the access control circuit to provide for each the respective memory access request signal received at least one respective replicated memory access request signal (for instance, RSc1; RSc1', RSc2'), accessing (for instance, 206) indexed internal memory locations in the plurality of indexed internal memory locations both as a function of a respective memory access request signal received and as a function of at least one respective replicated memory access request signal to thereby retrieve a first data signal (for instance, D; D1') retrieved as a function of the respective memory access request signal received (for instance, RS; RS') and at least one second data signal (for instance, D2; D2', D3') retrieved as a function of at least one respective replicated memory access request signal (for instance, RSc1; RSc1', RSc2'), checking for identity (for instance, 208, 210; 208', 216, 222, 228) the first data signal retrieved and the at least one second retrieved data signal, and operating the access control circuit, to transmit (for instance, 212, 214; 214', 220, 226, 230, 232) to the processing circuit:

i) a signal out of the first data signal retrieved and the at least one second data signal as a result of a positive outcome (for instance, 212; 214', 220, 226, 230) of the identity check therebetween, ii) an integrity error flag signal (for instance, CEF; UEF) as a result of a negative outcome of the identity check.

In one or more embodiments, the method may comprise:
receiving at the processing circuit the either one of the signals transmitted thereto by the access control circuit, and
operating the processing circuit block as a function of the signals (for instance, D1, CEF; D1', CEF, UEF) transmitted thereto by the access control circuit.

In one or more embodiments, the method may comprise:
providing the processing circuit block and the access control circuit as a system-on-chip, and
providing the data storage memory as an off-chip data storage memory circuit block.

In one or more embodiments, the method may comprise:
replicating at least twice (for instance, 204') the respective memory access request signals received (for instance, RS') at the access control circuit to provide for each the respective memory access request signal received at least two respective replicated memory access request signals (for instance, RSc1', RSc2'), accessing (for instance, 206') indexed internal memory locations in the plurality of indexed internal memory locations both as a function of a respective memory access request signal received and as a function of at least two respective replicated memory access request signals to thereby retrieve a first data signal (for instance, D1') retrieved as a function of the respective memory access request signal received as well as at least two further data signals (for instance, D2', D3') retrieved as a function of the at least two respective replicated memory access request signal, checking for identity (for instance, 208', 210', 216, 218, 222, 224) the first retrieved data signal as well as the at least two further data signals retrieved, and operating the coupling circuit to selectively provide (for instance, 228) to the processing circuit:

i) as a result of the identity check providing only positive outcomes, a signal out of the first data signal retrieved and the at least two further data signals, ii) as a result of the identity check providing a majority of positive outcomes over negative outcomes, a signal out of the first data signal retrieved and the at least two further data signals having provided a positive outcome of the identity check (for instance, 208', 216, 222) along with a first integrity error flag signal (for instance, CEF), the first integrity error flag signal being indicative of a correctable error, ii) as a result of the identity check (for instance, 208', 216, 222, 228) providing a majority of negative outcomes over positive outcomes, a second integrity error flag signal (for instance, UEF), the second integrity error flag signal being indicative of an uncorrectable error.

One or more embodiments may comprise a system-on-chip, which may comprise:

a processing circuit block (for instance, 12) configured to generate memory access request signals (for instance, RS1; RSn), and, an access control circuit (for instance, 100) coupled to the processing circuit block and configured to receive (for instance, 202) memory access request signals sourced from a processing circuit and access indexed memory locations (for instance, ADDR1, ADDRn) in a plurality of indexed memory locations to retrieve data signals (for instance, D) therein as a function of respective memory access request signals received (for instance, RS1, RSn)

wherein the system-on-chip is configured to operate according to one or more embodiments of the method (for instance, 20).

One or more embodiments may comprise to a device (for instance, 10), which may comprise:

an off-chip data storage memory (for instance, 14) configured to store data signals (for instance, D) in a plurality of indexed internal memory locations (for instance, ADDR1, ADDRn) and to provide respective data signals as a function of respective memory access request signals (for instance, RS1, RSn), one or more embodiments of the system-on-chip, wherein the access control circuit (for instance, 100) is coupled to the off-chip data storage memory.

In one or more embodiments, the device may further comprise:

a first bus (for instance, B12) coupling the processing circuit block and the access control circuit therebetween and configured to communicate data related to memory access requests from the processing circuit block, and a second bus (for instance, B14) coupling the access control circuit and the data storage memory and configured to communicate therebetween data related to memory access requests from the processing circuit and/or data read from the memory (for instance, D1, D2; D1', D2', D3') as a result of such data access requests from the processing circuit.

In one or more embodiments, the first bus and the second bus may each comprise an AXI 4 compliant bus equipped with integrity protection functionalities.

One or more embodiments may comprise a vehicle (for instance, V), equipped with a plurality of sensors (for instance, SD) and actuators (for instance, A) and with one or more embodiments of the system-on-chip or one or more embodiments the device (10) as per the present disclosure, wherein the data storage memory may be configured to store data from the sensors and the system-on-chip is coupled to sensors and actuators in the vehicle.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method of accessing a data storage memory configured to store data signals in a plurality of indexed memory locations, the method comprising:

coupling an access control circuit to the data storage memory, the access control circuit configured to receive memory access request signals sourced from a processing circuit and to access indexed memory locations in the plurality of indexed memory locations to retrieve data signals therein as a function of respective memory access request signals received;

replicating at least once the respective memory access request signals received at the access control circuit to provide for each respective memory access request signal received at least one respective replicated memory access request signal;

accessing indexed internal memory locations in the plurality of indexed memory locations both as a function of a respective memory access request signal received and as a function of at least one respective replicated memory access request signal to thereby retrieve a first data signal retrieved as a function of the respective memory access request signal received and at least one second data signal retrieved as a function of at least one respective replicated memory access request signal;

checking for identity the first data signal and the at least one second data signal; and operating the access control circuit to transmit to the processing circuit:

i) a data signal out of the first data signal retrieved and the at least one second data signal as a result of a positive outcome of the identity check therebetween; or ii) an integrity error flag signal as a result of a negative outcome of the identity check.

2. The method of claim 1, comprising:
receiving at the processing circuit either the data signal or the integrity error flag signal; and
operating the processing circuit as a function of the signal transmitted thereto by the access control circuit.

3. The method of claim 1, wherein the processing circuit and the access control circuit are provided as a system-on-chip.

4. The method of claim 1, wherein the method comprises:
replicating at least twice the respective memory access request signals received at the access control circuit to provide, for each respective memory access request signal, at least two respective replicated memory access request signals;
accessing indexed internal memory locations in the plurality of indexed internal memory locations both as a function of a respective memory access request signal received and as a function of at least two respective replicated memory access request signals to thereby retrieve a first data signal retrieved as a function of the respective memory access request signal received as well as at least two further data signals retrieved as a function of the at least two respective replicated memory access request signal;
checking for identity the first retrieved data signal as well as the at least two further data signals retrieved; and
operating the access control circuit to selectively provide to the processing circuit:
  i) as a result of the identity check providing only positive outcomes, a data signal out of the first data signal retrieved and the at least two further data signals;
  ii) as a result of the identity check providing a majority of positive outcomes over negative outcomes, a signal out of the first data signal retrieved and the at least two further data signals having provided a positive outcome of the identity check along with a first integrity error flag signal that is indicative of a correctable error; and
  iii) as a result of the identity check providing a majority of negative outcomes over positive outcomes, a second integrity error flag signal that is indicative of an uncorrectable error.

5. The method of claim 3, wherein the data storage memory is provided as an off-chip data storage memory circuit block.

6. A method comprising:
receiving memory access request signals sourced from a processing circuit;
accessing indexed memory locations in a data storage memory to retrieve data signals from the data storage memory as a function of respective memory access request signals received;
replicating the respective memory access request signals to provide for each memory access request signal a replicated memory access request signal;
accessing indexed internal memory locations both as a function of a respective received memory access request signal and as a function of a respective replicated memory access request signal to thereby retrieve a first data signal retrieved as a function of the respective memory access request signal received and a second data signal retrieved as a function of the respective replicated memory access request signal;
checking for identity the first data signal retrieved and the second retrieved data signal;
transmitting, to the processing circuit, the first data signal or the second data signal when the first data signal matches the second data signal; and
transmitting, to the processing circuit, an integrity error flag signal when the first data signal does not match the second data signal.

7. The method of claim 6, further comprising:
receiving at the processing circuit either the first or second data signal or the integrity error flag signal; and
operating the processing circuit as a function of the received signal.

8. The method of claim 6, wherein the method is performed by an access control circuit that, along with the processing circuit, is a system-on-chip.

9. The method of claim 6, wherein the replicating comprises replicating a plurality of times the respective memory access request signals received to provide for each respective memory access request signal received a plurality of respective replicated memory access request signals;
wherein accessing the indexed internal memory locations in the plurality both as a function of the respective received memory access request signal and as a function of the respective replicated memory access request signal comprises accessing the indexed internal memory locations both as a function of the respective memory access request signal received and as a function of a plurality of respective replicated memory access request signals to thereby retrieve the first data signal as a plurality of second data signals; and
wherein the checking comprises checking for identity the first retrieved data signal the plurality of second data signals.

10. The method of claim 9, wherein transmitting the first data signal or the second data signal occurs when the first data signal matches all of the second data signals.

11. The method of claim 8, wherein the data storage memory is an off-chip data storage memory circuit block that is separate from the system-on-chip.

12. The method of claim 10, wherein transmitting the integrity error flag signal comprises transmitting a first integrity error flag signal when the first data signal matches a majority but not all of the second data signals and transmitting a second integrity error flag signal when the first data signal does not match a majority of the second data signals.

13. The method of claim 10, wherein transmitting the integrity error flag signal occurs when the first data signal does no matches all of the second data signals.

14. A system-on-chip, comprising:
a processing circuit block configured to generate memory access request signals; and
an access control circuit coupled to the processing circuit block and configured to:
  receive memory access request signals sourced from a processing circuit;
  access indexed memory locations in a data storage memory to retrieve data signals from the data storage memory as a function of respective memory access request signals received;
  replicate the respective memory access request signals to provide for each memory access request signal a replicated memory access request signal;
  access indexed internal memory locations both as a function of a respective received memory access request signal and as a function of a respective replicated memory access request signal to thereby retrieve a first data signal retrieved as a function of the respective memory access request signal received and a second data signal retrieved as a function of the respective replicated memory access request signal;

check for identity the first data signal retrieved and the second retrieved data signal;

transmit, to the processing circuit, the first data signal or the second data signal when the first data signal matches the second data signal; and transmit, to the processing circuit, an integrity error flag signal when the first data signal does not match the second data signal.

15. The system-on-chip of claim 14, wherein the access control circuit is configured to:

replicate a plurality of times the respective memory access request signals received to provide for each respective memory access request signal received a plurality of respective replicated memory access request signals;

access the indexed internal memory locations both as a function of the respective memory access request signal received and as a function of a plurality of respective replicated memory access request signals to thereby retrieve the first data signal as a plurality of second data signals; and check for identity the first retrieved data signal the plurality of second data signals.

16. A device, comprising:

an off-chip data storage memory configured to store data signals in a plurality of indexed internal memory locations and to provide respective data signals as a function of respective memory access request signals; and the system-on-chip of claim 14, wherein the access control circuit is coupled to the off-chip data storage memory.

17. The system-on-chip of claim 15, wherein the access control circuit is configured to transmit to the processing circuit block:

the first data signal or the second data signal when the first data signal matches all of the second data signals;

a first integrity error flag signal when the first data signal matches a majority but not all of the second data signals; and a second integrity error flag signal when the first data signal does not match a majority of the second data signals.

18. The device of claim 16, further comprising:

a first bus coupling the processing circuit block and the access control circuit therebetween and configured to communicate data related to memory access requests from the processing circuit block; and a second bus coupling the access control circuit and the data storage memory and configured to communicate therebetween data related to memory access requests from the processing circuit and data read from the off-chip data storage memory as a result of such data access requests from the processing circuit.

19. A vehicle, comprising:

the system-on-chip of claim 16; and a plurality of sensors and actuators coupled to the system-on-chip, wherein the data storage memory is configured to store data from the sensors.

20. The device of claim 18, wherein the first bus and the second bus each comprise an AXI 4 compliant bus equipped with integrity protection functionalities.

* * * * *